Aug. 7, 1928.
A. BLANCAFORT
1,680,200
ROAD MAP
Filed Dec. 18, 1926  2 Sheets-Sheet 1
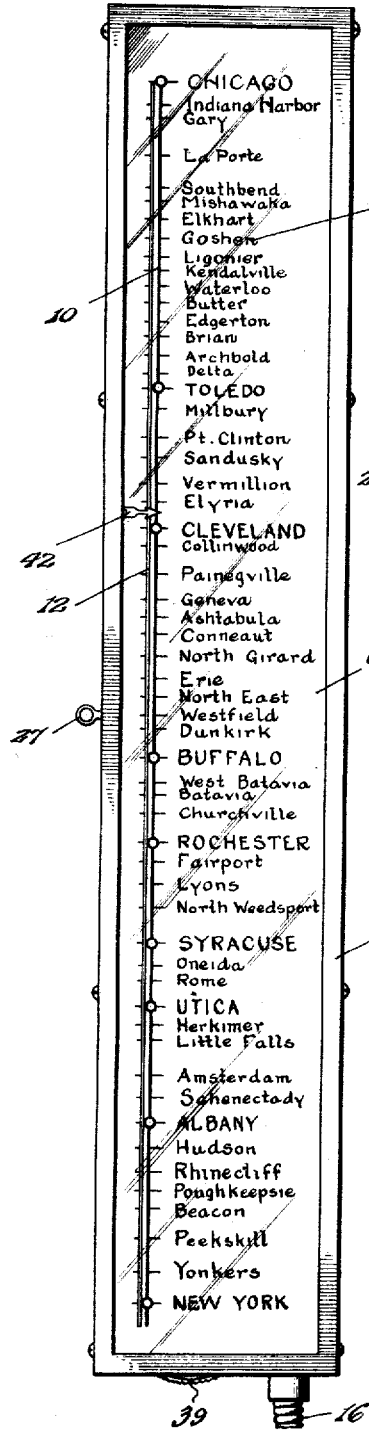
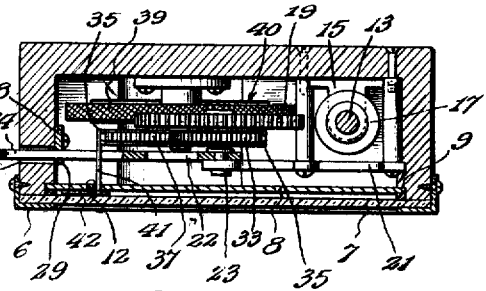
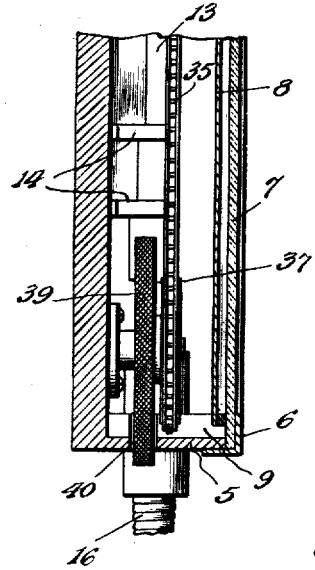
Inventor
A. Blancafort.
By Lacey & Lacey, Attorneys

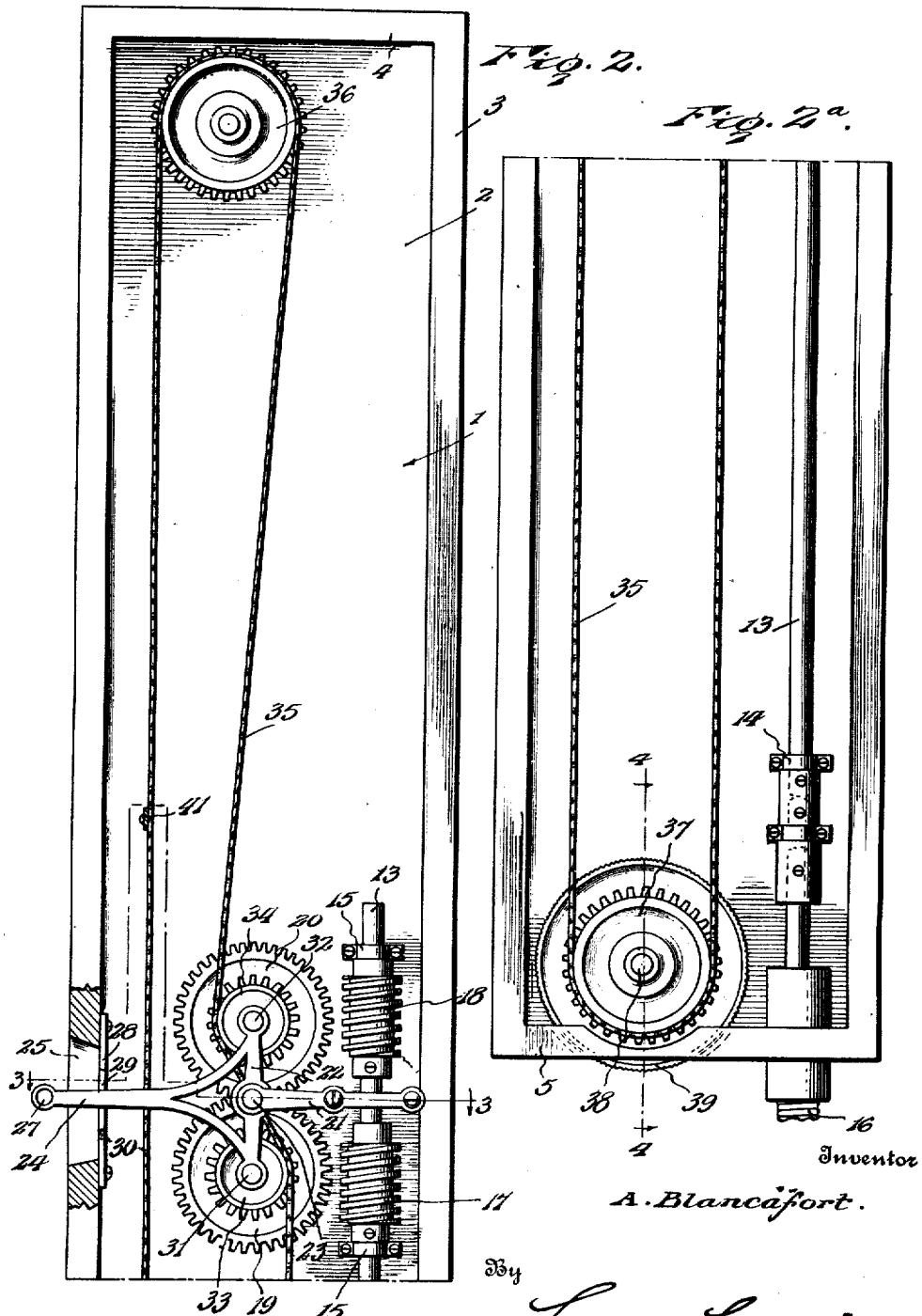

Patented Aug. 7, 1928.

1,680,200

UNITED STATES PATENT OFFICE.

ANTONIO BLANCAFORT, OF LA GARRIGA, BARCELONA, SPAIN.

ROAD MAP.

Application filed December 18, 1926. Serial No. 155,623.

This invention relates to road maps and more particularly to that type which are designed to automatically indicate the location of a vehicle upon which they are employed. Ordinarily, road maps of this type are in the form of a strip which is automatically unwound from one roll and taken up by another roll but such devices present the disadvantage that only a part of the itinerary is shown and it is impossible for the passenger to determine how far he is required to travel to reach a certain city, town, or the like, unless he consults another independent and distinct map. Therefore, the usefulness of such maps is limited. The present invention, therefore, has as its primary object to provide a map of the general class mentioned which will present the advantage that it will display to view a complete itinerary of a given route, in combination with an automatically moving indicator member which indicates the location of the vehicle, so that one consulting the map is not only apprised of his location at the time but also the places he has passed and the places toward which he is traveling, in the order in which they will be reached.

Another object of the invention is to so construct the indicating map that it may be readily and quickly reset so as to serve its purpose on the return trip.

Another object of the invention is to so construct the map that any number of route strips may be substituted one for another in a moment's time and without any material disarrangement of the component parts of the device.

Another object of the invention is to so construct the device that it will operate with certainty and will not be liable to any disarrangement of its parts.

Another object of the invention is to so construct the device that if one should branch off from some town or city and, after returning thereto, resume the journey, the indicating pointer may be immediately and conveniently reset to its proper place.

In the accompanying drawings:

Figure 1 is a plan view of the device embodying the invention.

Figures 2 and 2ª are associated views illustrating the device with the map strip removed so as to disclose the operating mechanism for automatically adjusting the indicating pointer.

Figure 3 is a vertical transverse sectional view taken substantially on the line 3—3 of Figure 2, looking in the direction indicated by the arrows.

Figure 4 is a vertical sectional view taken substantially on the line 4—4 of Figure 2ª, looking in the direction indicated by the arrows.

The device embodying the invention comprises an oblong rectangular casing 1 including a bottom 2, side walls 3, and end walls 4 and 5, and a rectangular frame 6 is adapted to the open side of the casing and confines the margins of a pane 7 of glass or other transparent material through which the route strip, which is indicated by the numeral 8, may be viewed, this sheet or strip being disposed within the said open side of the casing with its margins resting upon shoulders 9 provided upon the inner sides of the side and end walls of the casing. The map strip or route strip 8, may be of any material found suitable for the purpose, such for example as cardboard or celluloid, preferably the latter, and it bears, at one side of a route line 10, printed upon its face near one longitudinal margin, a list 11 of cities and towns constituting the itinerary of the route which is to be followed in using the map. For a purpose to be presently explained, the route strip 8 is provided with a slot 12 which extends close to and parallel to the route line 10.

The numeral 13 indicates a shaft journaled in suitable bearings 14 and 15 preferably mounted upon the bottom 2 of the casing, and the said shaft extends longitudinally within the casing adjacent one of the side walls 3 thereof and has connected to one of its ends, namely the lower end, a flexible shaft 16 which is driven from one of the wheels of the automobile, car, or other vehicle or conveyance, it being understood that the device is capable of employment on railways as well as on automobiles. Worms 17 and 18 are fixed upon the shaft 13 at its other end and gears 19 and 20 are adapted to be brought selectively into mesh with the worms 17 and 18. The numeral 21 indicates a bracket mounted within the casing and the numeral 22 indicates a rocking yoke which is pivotally mounted as at 23 upon the end of the bracket, the yoke having a lever arm 24 extending therefrom and through a slot 25 in one side wall of the casing, a finger piece 27 being fixed upon the outer end of the lever arm whereby it may be conveniently manipulated so as to rock the yoke, a detent plate 28 being mounted upon the said side wall of the casing at said slot 25 and having a raised intermediate portion 29 and depressed end portions 30 into which the lever arm 24 may be selectively brought to rest, the arm being adapted to be held in a neutral position by frictional engagement with the more elevated intermediate edge portion 29 of the said plate.

The gears 19 and 20 mesh with each other and they are mounted respectively upon shafts 31 and 32 and upon these shafts there are mounted sprocket gears indicated by the numerals 33 and 34. The numeral 35 indicates an endless sprocket chain which is trained about one side of the sprocket gear 34 and thence about the other side of the sprocket gear 33 and at its upper portion about a sprocket gear 36 rotatably mounted in the upper end of the casing. At its lower portion, the sprocket chain is trained about a sprocket gear 37 fixed upon a shaft 38 journaled in the lower end of the casing, and there is likewise fixed upon this shaft a finger wheel 39 having a knurled periphery, the lower side of the finger wheel projecting through a slot 40 in the lower end wall 5 of the casing so that when the gears 19 and 20 are both out of mesh with their respective worms 17 and 18, the thumb may be run over the periphery of the finger wheel 39 so as to impart travel to the chain 35, this being done in resetting the mechanism.

The other stretch of the chain 35 runs between the gears 36 and 37 and parallel to the adjacent side wall of the casing and immediately beneath the slot 12 in the route strip 8, and connected to one of the links of this stretch of the chain is a supporting finger 41 which works in the said slot 12 and which carries an indicating pointer 42 which is preferably of a distinctive color and of arrow shape and points to the list 11 of cities and towns.

From the foregoing description of the invention, it will be evident that when the device is installed and the flexible shaft 16 is operatively geared with one of the wheels of the vehicle, the finger wheel 39 having been rotated so as to position the indicating pointer 42 opposite the city or town in which the automobile is at that time located, the lever 24 will be swung upwardly or downwardly, depending upon the direction in which the automobile is to be driven, so as to bring either the gear 19 or the gear 20 into mesh with the respective worm 17 or 18. As the shaft 13 is rotated, motion will be imparted to the chain 35 with the result that the pointer 42 will ride along in the slot 12 to successively indicate the cities and towns through which the automobile is driven. If it is desired to reset the device, it is only necessary to swing the lever 24 to position to bring both gears 19 and 20 out of mesh with their respective worms and then manipulate the finger wheel 39, and when the return trip is to be made, the lever 24 is shifted in the direction the opposite to that in which it was shifted in the first instance.

Having thus described the invention, what I claim is:

1. In an automatic road map, a casing, a route strip bearing an itinerary of the route carried by the casing, an indicating pointer movable along the itinerary, spaced sprocket gears supported in the ends of the casing, a sprocket chain trained about the gears and supporting the said pointer at one of its stretches, a rotary shaft extended into the casing, worms carried thereby, a rocking support supported by the casing, worm gears mounted thereon for engagement selectively with the worms upon the said shaft, sprocket gears carried by the worm gears and over which the other stretch of the chain is trained, and means for rocking the said supporting member whereby to selectively engage either worm gear with its worm to change the course of travel of the said sprocket chain.

2. In an automatic road map, a casing, a route strip bearing an itinerary of the route carried by the casing, an indicating pointer movable along the itinerary, spaced sprocket gears mounted in the casing, a sprocket chain trained about the gears and supporting the said pointer at one of its stretches parallel to the itinerary, a rotary shaft extended into the casing, worms carried thereby, a rocking support mounted in the casing, worm gears mounted thereon for engagement selectively with the worms upon the said shaft, sprocket gears carried by the worm gears and over which the other stretch of the chain is trained, means for rocking the said supporting member whereby to selectively engage either worm gear with its worm to change the course of travel of the said sprocket chain, and a single wheel connected with one of the first-mentioned sprockets and constituting means for imparting travel to the chain to reset the pointer when the rocking member is in neutral position.

3. In an automatic road map, a casing, a route sheet having an itinerary of the route carried by the casing, spaced sprocket gears journaled in the casing, a sprocket chain trained around the gears, an indicating pointer movable along the itinerary, a rocking support mounted in the casing, gears carried by the support for engagement with the opposite side of the sprocket chain at points between the sprocket gears, means to rock the support, and means for selectively driving the gears to cause the chain to travel in opposite directions.

In testimony whereof I affix my signature.

ANTONIO BLANCAFORT. [L. S.]